United States Patent [19]

Huang et al.

[11] Patent Number: 5,398,331

[45] Date of Patent: Mar. 14, 1995

[54] SHARED STORAGE CONTROLLER FOR DUAL COPY SHARED DATA

[75] Inventors: Kevin C. Huang, Endicott; David A. Wise, Binghamton, both of N.Y.

[73] Assignee: International Business Machines Corporation, Armonk, N.Y.

[21] Appl. No.: 910,193

[22] Filed: Jul. 8, 1992

[51] Int. Cl.⁶ .......................................... G06F 11/00
[52] U.S. Cl. ..................... 395/575; 371/9.1; 371/5.4; 371/10.1; 364/268.1; 364/228.9; 364/DIG. 1
[58] Field of Search ............ 395/575; 364/228.1, 364/228.8, 228.9, 238.4, 240.5, 268.1, 268.3, 269; 371/5.4, 9.1, 10.1

[56] References Cited

U.S. PATENT DOCUMENTS

| | | | |
|---|---|---|---|
| 4,007,448 | 2/1977 | Sergeant et al. | 340/172.5 |
| 4,099,241 | 7/1978 | Ossfeldt | 364/200 |
| 4,351,023 | 9/1982 | Richer | 364/187 |
| 4,371,754 | 2/1983 | De et al. | 179/18 EE |
| 4,381,543 | 4/1983 | Bunten, III et al. | 364/200 |
| 4,468,731 | 8/1984 | Johnson et al. | |
| 4,527,271 | 7/1985 | Hallee et al. | 371/20 |
| 4,675,811 | 6/1987 | Kishi et al. | 364/200 |
| 4,680,753 | 7/1987 | Fulton et al. | 370/85.1 |
| 4,718,002 | 1/1988 | Carr | 364/200 |
| 4,733,352 | 3/1988 | Nakamura et al. | 364/200 |
| 4,751,702 | 6/1988 | Beier et al. | 371/9 |
| 4,823,256 | 4/1989 | Bishop et al. | 364/200 |
| 4,849,978 | 7/1989 | Dishon et al. | 371/51.1 |
| 4,958,270 | 9/1990 | McLaughlin et al. | 364/187 |
| 4,958,273 | 9/1990 | Anderson et al. | 364/200 |
| 4,959,768 | 9/1990 | Gerhart | 364/187 |
| 5,124,987 | 6/1992 | Milligan et al. | 371/10.1 |
| 5,148,533 | 9/1992 | Joyce et al. | 395/425 |
| 5,155,845 | 10/1992 | Beal et al. | 395/575 |
| 5,161,214 | 11/1992 | Addink et al. | |
| 5,201,040 | 4/1993 | Wada et al. | 364/200 |
| 5,201,053 | 4/1993 | Benhase et al. | 364/200 |
| 5,274,645 | 12/1993 | Idleman et al. | 371/10.1 |
| 5,280,611 | 1/1994 | Mohan et al. | 371/12 |
| 5,293,602 | 3/1994 | Fukagawa et al. | 364/200 |
| 5,313,602 | 5/1994 | Nakamura | 395/425 |

FOREIGN PATENT DOCUMENTS 0234598  2/1987  European Pat. Off. .

OTHER PUBLICATIONS

IBM Technical Disclosure Bulletin, vol. 33, No. 11, Apr. 1991, pp. 357–359, T. Hackett, "Use of XCF To Facilitate Communication Among Independent Process".

Primary Examiner—Robert W. Beausoliel, Jr.
Assistant Examiner—Albert Decady
Attorney, Agent, or Firm—Arthur J. Samodovitz; Lynn L. Augspurger

[57] ABSTRACT

A computing system constructed of multiple processing elements containing private storage, attached to a shared global storage, is called a closely-coupled system. Each processing element may be a single processing unit (PU) with private storage, or a tightly coupled multi-processor unit with private storage. Either type of processing element will be referred to as a Central Processor Complex (CPC), the computing system complex as a whole is referred to as a sysplex. IBM ESA/390 processors provide examples of both single and multi-processor CPC's. For a highly-available shared storage for data-sharing in a multi-processing element environment, highly-available shared storage is provided by a duplexed controllers with non-volatile storage, which is accessed by tightly connected Processing Elements as a single logical copy. Our duplexed controllers provide not only the shared data but also the control information necessary for multi-Processing Element data management with speed-matching processor. The duplexed controllers, including a primary and backup controller, are always synchronized to execute each message command to ensure that they do not diverge. Each controller of the duplexed controller receives its own command from a Processing Element and reaches consensus with other controller to synchronize command execution and return a response code to the Processing Element. To sequence and synchronize the command execution by each of the duplexed controller, a tightly-synchronized Sysplex timer is used to time-stamp each command and response so that the duplexed controllers will run in synchronism. When an "out of sync" condition is detected by a SSC, the monitoring information of SSC and integrated SP, and the result of diagnostics are used to determine the faulty SSC of a the duplexed SSC.

18 Claims, 1 Drawing Sheet

SHARED STORAGE CONTROLLER FOR DUAL COPY SHARED DATA

FIELD OF THE INVENTION

This invention relates to a computing system apparatus and particularly to a storage controller for a cluster or sysplex of processing elements.

RELATED CO-PENDING APPLICATION

The assignee of this application, International Business Machines Corporation, Armonk, N.Y., is also the assignee of a co-pending application, namely, U.S. patent application Ser. No. 07/754,815 filed Sep. 4, 1991 by B. Glendening, entitled "Method and Apparatus for Timer Synchronization in a Logically Partitioned Data Processing System."

This co-pending application is incorporated by reference.

GLOSSARY OF TERMS

While dictionary meanings are also implied by certain terms used here, the following glossary of some terms may be useful.

| | |
|---|---|
| Sysplex | A cluster of multiple processors. |
| Central Processor Complex (CPC) | An individual processing element or functional unit of a Sysplex. |
| SSC | Shared storage controller as described herein. |
| TOD | Time of day clock. |
| SP | Integrated support processor which performs monitoring and logging of operations of a CPC. |
| ETR | External timer reference unit which provides tightly synchronized time of day TOD for all units of our sysplex. |
| ISC | Intersystem channel which is the pathway between the processing elements and the controllers. There is also one pathway between the dual controllers. The pathway provides the coupling of functional units of the computer system. A bus is the internal connection within the functional unit and is a channel. |
| IOP | I/O processor which can be one of the functional units or processing element in both the SSC and CPC for controlling I/O channel operations. |
| DASD | Disk memory system. |
| Message | A request or response with data and control information. |
| Glossary term two | Description of Glossary term two. |

BACKGROUND OF THE INVENTION

A cluster of host computing systems attached to a global shared storage unit is called System Complex, or Sysplex. With each host computing system running with a single operating system, the Sysplex will have a multisystem operating system. Each host computing system consists of processors with its channel I/O devices is referred to as a Central Processor Complex (CPC).

One kind of sysplex system has been described in the referenced application assigned to the International Business Machines Corporation, U.S. Ser. No. 07/754,815 filed Sep. 4, 1991 by B. Glendening, entitled "Method and Apparatus for Timer Synchronization in a Logically Partitioned Data Processing System." A sysplex timer is used to provide synchronization among multiple hosts.

Closely-coupled systems with a global shared storage communicate and synchronize the operations of the total system through the shared memory. A highly-available closely coupled-system requires all the critical system components be designed to tolerate faults and be highly-available. The global shared data is a critical system component on which all the connected CPCs depend, therefore it is imperative that the global shared storage controller and its data be highly-available.

The shared storage controller (SSC)is used not only as repository of customer's data for critical data base application, but also providing control information to manage multiple systems. Loss of the shared data in a SSC is a disaster that customer can ill afford. With this shared controller's design, the primary and backup SSC can be physically separated so that failures of a SSC is unlikely to propagate to the other controller.

The prior art approach to the highly available shared storage controller used fault-tolerant design with multiple processors operating in lock-step synchronism or a dual-copy system controlled by a CPC. The lock-step synchronized multiple processor approach requires unduly complex hardware and costly development to maintain synchronization and compare or vote on results. Processors with high built-in error-detection circuits do not need to depend on the lock-step design of processors to detect faults. Faults occurring during normal operation will be detected quickly by the error-detecting hardware.

Many previous designs of dual-copy systems provide a duplicate copy of data by writing the data to the primary device and the secondary device. It is a straight-forward approach of maintaining two copies of data in two devices. One kind of dual copy function has been described in the IBM TDB by J. T. Robinson in the article called "Method for Scheduling Writes in a Duplexed DASD Subsystem", TDB vol. 29 Oct. 5, 1986, pp 2102–2107. Another dual copy function has been described by B. H. Berger in IBM docket TU986013 titled "Maintaining duplex paired devices by means of a dual copy function". The current invention provides not only dual copy of shared data but also maintaining data coherency of shared data by the SSC for all CPCs.

To achieve dual copy function of shared data, the current invention employs technique of parallel execution of message commands in duplexed shared storage controllers, (SSC) with synchronization being performed between the primary and secondary controllers instead of by the originating CPC. The command execution is sequenced and synchronized at the SSC using timestamp values from a tightly-synchronized TOD which is transmitted to all the CPC's and SSC.

One of the major roadblocks in designing synchronized duplexed controller or processor is the difficulty in determining the faulty processor after a failure. An "out of sync" condition or timeout of an operation in either controller is usually not sufficient to determine the faulty processor, especially for complex mainframe processors. There are obscure error conditions that may cause the loosely synchronized operation to lose synchronization, and they can not be easily detected by the processor itself. This invention has a novel feature of using an integrated support processor (SP) of each CPC and SSC to monitor and diagnose the abnormal conditions of processor operations in each synchronization interval. That monitoring information will significantly enhance the diagnosis of faulty processor by SSC when an "out of sync" is detected during an message operation.

It is also the object of the present invention to repair a failing page of shared storage in controller. A corrupted storage page will be repaired by copying good data from the same virtual address of the other controller. The recovery action will be transparent to programs of both controllers and connected CPCs.

SUMMARY OF THE INVENTION

We have provided a highly-available shared storage for data-sharing in a multi-processing element environment. The highly-available shared storage is provided by a duplexed controllers with non-volatile storage, which is accessed by tightly connected Processing Elements as a single logical copy. Our duplexed controllers provide not only the shared data but also the control information necessary for multi-Processing Element data management with speed-matching processor.

Our duplexed controllers, including a primary and backup controller, are always synchronized to execute each message command to ensure that they do not diverge. Each controller of the duplexed controller receives its own command from a Processing Element and reaches consensus with other controller to synchronize command execution and return a response code to the Processing Element. To sequence and synchronize the command execution by each of the duplexed controller, a tightly-synchronized Sysplex timer is used to time-stamp each command and response so that the duplexed controllers will run in synchronism.

In accordance with our invention and to achieve the above objects we have provided a storage controller system for a sysplex or cluster of many multi-processor elements with non-volatile data storage. The duplexed controllers are tightly coupled with a interchannel coupling to a cluster of computing systems. Each of the the two storage controllers is separately powered and identically configured. We have provided an integrated service processor SP which is used for monitoring and logging any exceptional conditions and error events in said storage controllers for each synchronization interval. This SP provides assistance in diagnosis of a faulty storage controller when an "out of sync" condition is detected.

Each of the dual storage controllers with a latch setting defines a role for that storage controller as a primary or backup controller. The synchronization mechanism provided by the primary and backup controllers for each message command execution produce a dual copy of non-volatile shared data for all the connected processing elements.

We have provided in our preferred embodiment a tightly synchronized time of day clock functioning as a timer for all the sysplex computing systems to provide a consistent time of day view across the computing systems and storage controller for use in sequencing the command execution and for synchronizing message operation responses.

Duplex parallel execution of each command received from the processing element is synchronized for duplex parallel execution and synchronization points are established during command execution in the primary and the backup controller, and at each synchronization point, our SCS controller and the coupled integrated service processor examines the commands and responses to ensure that the duplexed storage controller system operates in synchronism.

Other features and improvements will be described in detail with reference to the following drawings.

DETAILED DESCRIPTION OF THE INVENTION

In a closely-coupled multi-system for data-sharing, a cluster of independent central processing complexes (CPC) are connected to a common shared-storage controller (SSC) which provides access to shared data and controls of shared resources for data coherency. Each CPC is running with a separate copy of operating system. In this multi-system structure, the systems cooperatively work together to provide a single system image and allow this image to be managed as a single entity to users and other remote computer systems in a network. The coordination of use of shared data and workload require communication through the SSC to maintain data integrity.

Figure 1:
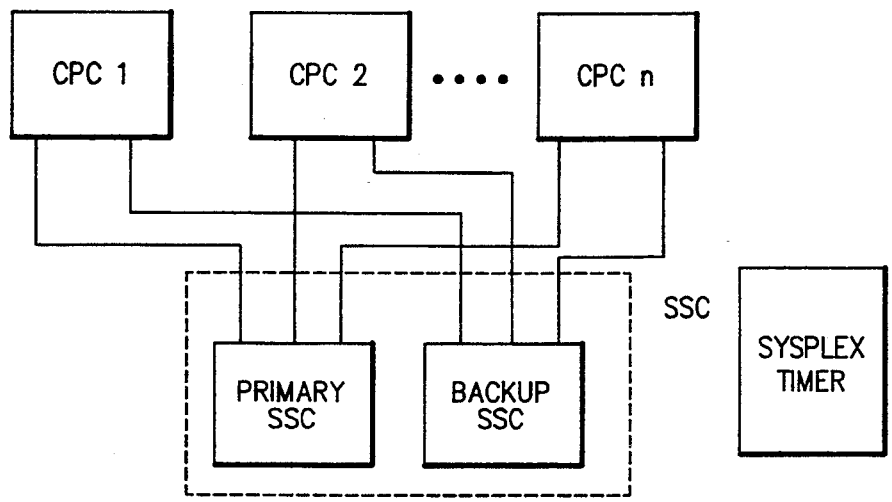
FIG. 1 shows schematically an overview of the Sysplex configuration with a duplexed SSC and particularly shows the connections of the SSC to multiple CPCs in data-sharing environment.

The major components of a sysplex include CPCs, sysplex timer, and shared storage controller as shown in FIG. 1 on page 1. The SSC is a duplexed controller which consists of two identically-configured and separately powered controllers. Functionally, one controller of the duplexed controller will be designated as the primary controller and the other as backup controller. The primary SSC and its backup are physically separated so that one of the SSC can serve as backup controller. The backup controller provides redundancy of data, and will operate as the primary controller in simplex mode should the primary controller fails.

Also included in the system configuration is an external timer reference (ETR) unit which provides a centralized fault-tolerant time reference which is used in maintaining Time of Day (TOD) synchronism for all the CPC's and SSC. The ETR unit provides redundant time transmissions to every connected processors using dedicated fiber optic cables. Adaptive link tuning by the ETR unit to accommodate cable and processor implementation differences holds TOD skew between the CPC's to a well defined limit. The tightly-synchronized timer is used to sequence message command execution by SSCs for all connected CPC's.

Figure 2:
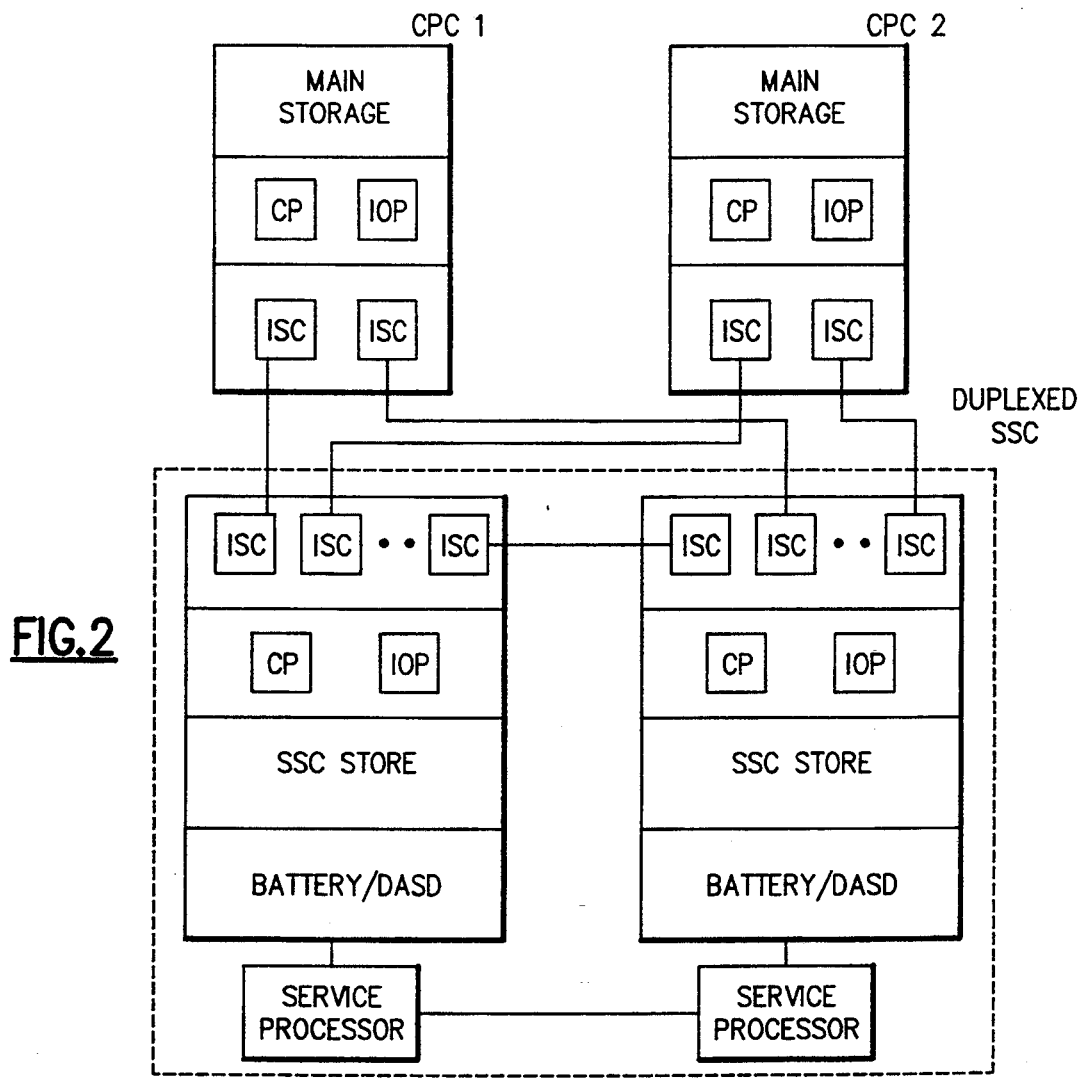
FIG. 2 shows the intersystem channel connections between the duplexed SSC and the CPCs.

FIG. 2 on page 2 shows intersystem channel (ISC) that connects each CPC with the duplexed SSC. Two point-to-point ISC links are provided from each CPC to a duplexed SSC. The ISC consists of fiber optic transceivers and a microprocessor for control of data movement and interrupts. It also communicates with the IOP which initiates command. In addition to the links between the CPCs and the SSC, another intersystem channel link is also provided for command synchronization between the primary and backup SSC. Each CPC mainly consists of ESA/390 processors and its service processor. The ESA/390 processors consists of CP's (central processors) and IOP (I/O processor). The SSC is built with the same ESA/390 processors as the CPC for speed matching with the addition of battery and DASD which provide non-volatile storage for the SSC. The battery provides continued power for brief power supply outage. Storage contents will be saved to the DASD when a prolonged power outage occurs.

From a system viewpoint, a Send Message instruction is used by a CPC to access the external shared storage in the SSC. The send message instruction can be executed either synchronously or asynchronously. During a synchronous instruction execution, the CP waits until all the SSC operations started by send message are completed. If the instruction is executed asynchronously, the CP passes initiative to the IOP to send a request to the SSC. The CP will proceed to execute the next instruction while the IOP continues its message operation. The ending status received subsequently by IOP will be returned to CP. Architecturally, the send message instruction is required to pass a message control block (MCB) to the SSC and a response of MRB (message response block) to conclude an message instruction. Optional data may be sent. Two types of message operations can be initiated: read/write message operations initiated by CPC and secondary operations initiated by SSC. When a send message instruction is initiated, the CP will signal the IOP which issues a SIGW command to the ISC with specified LCB. During the execution of an message instruction, the CP/IOP code formats the requests into a set of command block called LCB (link control block) which includes ICB (Intersystem channel command block) and buffers. The LCB contains a set of ICB which provides storage addresses of MCB, data and MRB for the message operations. The MCB will be fetched from the main storage and forwarded to the ISC for framing and transmission to the SSC.

During a command execution, requested data will also be sent. When the expected MRB is received by ISC, it is moved to the specified main storage location to complete the operation. If no errors or abnormal conditions were encountered during message operation, the CP will complete the synchronous instruction with the receipt of MRB and proceed to the next sequential instruction. For an asynchronous instruction, the IOP will report the ending condition. For the SSC-initiated fence and cross invalidation (XI) operations, a set of ICB chains will be built to handle the operations. A MCB will be sent to CPC and a response of MRB is returned to the SSC.

A consistent synchronization has to be maintained between the primary and secondary SSC for each command execution. This ensures dual copy of shared data in both controllers at the completion of each command execution. For CPC-initiated read/write instructions, the synchronization points will be established when a MCB is received by the SSC and when a MRB response is to be sent to a CPC. The IOP will ensure both MRBs are received and the message operation has ended in synchronism. For secondary operations, such as SSC-initiated fence and and cross-invalidation (XI) operation, synchronization points are also established when a MCB is launched and when a MRB is received by SSC. In each synchronization point, the service processor will be signalled so that SP can begin monitoring SSC operations for an synchronization interval.

When a send message instruction is issued by CP/IOP, the IOP will send one request to each of the duplexed controller. An identical MCB that is sent to both primary and secondary controllers will contain an identical TOD value beside the command code and other command-related information. Upon receipt of a MCB, the SSC will enqueue the command first, and then initiate synchronization actions. The synchronization actions begin with the primary controller which will communicate with the other controller to verify if the same command from the same CPC is received in sequence. No command execution will proceed until a consensus is reached on the command to be executed by both controllers. The primary and the backup SSC will send a MCB to the other SSC indicating the MCB to be executed next. The TOD value and command code of a MCB from the other SSC is compared against its own received MCB. It is then enqueued in the execution queue if an consensus is reached by both SSCs. During the synchronization phase, a MCB will also be checked for replicated, out of sequence and successful completion of the last command executed in SSC. This checking is to ensure all the commands previously issued by the CP/IOP of a CPC have completed successfully, and there is no missing command request between the current and the last command request. Synchronization action will also be done on MRB by both SSCs before it is being sent to the requesting CPC. Both SSCs must agree on the ending status except error conditions before the MRB is sent to the issuing IOP. For all the SSC-initiated secondary operations, the synchronization of MCB and MRB will be done in the same fashion as the CPC-initiated operations.

To achieve robust communication operations, failure detection and recovery is provided for intersystem channel operations at link-level and message-level. There are also procedures that may be used to restore a failing link. For a system with two or more ISC exist between CPC and SSC, alternate ISC can be used to recover a solid link failure. For many of error conditions, the receiver is required to return a reject response code to the sender for retry. At message level, recovery can be performed for buffer area. When a reject response is received at the sender, the sender is requested to restart the transmission of the entire buffer.

IOP will also ensure synchronization on MRB and MCB for read/write message operations and secondary message operations. IOP will always serialize the read/write message command with no overlapping operation. Ending status from the duplexed SSCs will be synchronized by the IOP before a response code is returned to CP. No new message command will be initiated to the SSC until the completion of the previous CP message instruction. If an IOP fails to receive a MRB or MCB within a time-out interval, error recovery at link level or message level will be attempted.

Due to the complexity of the system operations, the SSCs are susceptible to certain failure modes and exceptional conditions that are difficult to distinguish the failing SSC. Beside the error data collected by each SSC, additional information is needed for the problem determination. The Service Processor integrated in the SSC will monitor SSC operations for exceptional conditions and errors for each synchronization interval (SI). The monitoring activities collect information about abnormal conditions of all CP, IOP, memory, and the power controls operations in each SSC. Additional diagnostics can also be executed, if needed to determine the health of a SSC. With this additional monitoring and diagnostics information, the service processor will be able to diagnose the causes of "out of sync" condition in a SSC. These causes may include hardware machine checks, processor stop and pause, and other hardware recovery actions.

Whenever an "out of sync" condition is detected by primary or backup controller, an error interrupt will be sent to the control program in SP. The service processor will examine the status of last synchronization interval and the current operation logged by each SSC. The SP of both SSCs will exchange message via its remote SP interface for the operation status of the other SSC. If an unrecoverable error is detected in the last synchronization interval, the time-out value will be automatically extended for resynchronization of the same message operation. In all other cases, a consensus must be reached by both SPs in determining the faulty SSC. When a SSC is determined to be faulty, all the connected CPCs will be notified by the surviving SSC to quiesce. The SSC will continue to operate in non-redundant mode until all the outstanding requests have completed. The failing SSC will be quiesced and stopped, and then reset and initialized to the current state of the other SCC. During this quiesce state, the entire shared storage contents will be image-copied from the other SSC to the failed SSC. CPC will then be notified to resume operation and the duplexed SSC will be restarted in synchronism.

To avoid frequent error recovery, Fault-tolerant storage will be provided for the shared storage in SSC. However, it is still susceptible to memory uncorrectable error which usually results in an "out of sync." condition. The shared storage of the SSC is addressed with virtual address. If an uncorrectable storage error is detected in a SSC during command execution, a machine check will be raised and the failing page will be deallocated. The failing SSC will signal the other SSC to obtain the data of the failing virtual address to repair the real page. After a re-synchronization action, both SSCs will return to its normal operation.

While we have described our preferred embodiments of our invention, it will be understood that those skilled in the art, both now and in the future, may make various improvements and enhancements which fall within the scope of the claims which follow. These claims should be construed to maintain the proper protection for the invention first disclosed.

What is claimed is:

1. A computer system comprising:
   first and second storage controllers; and
   processor means for generating identical sequences of commands and sending said identical sequences to both of said storage controllers, each of said storage controllers being linked to said processor means to receive the respective sequence of commands without said respective sequence of commands first passing through the other storage controller; and wherein
   said first storage controller includes verification means for communicating with said second storage controller to verify that said second storage controller has received a same command as said first storage controller in said sequence and will execute said same command as said first storage controller next; and
   each of said storage controllers includes means, responsive to the verification, for executing said same command next.

2. A computer system as set forth in claim 1 wherein said verification means also communicates with said second storage controller to verify that both of said storage controllers have executed a last command preceding said same command before each executing means executes said same command.

3. A computer system as set forth in claim 1 wherein said verification means also verifies when both of said storage controllers have completed execution of said same command, and said first storage controller includes means, responsive to the verification of execution completion, for sending a completion signal to said processor means.

4. A computer system as set forth in claim 3 wherein said verification means also determines when an error condition has occurred during execution of said same command in said first storage controller, and the sending means responds to successful completion of execution of said same command in said second storage controller and an error condition during execution of said same command in said first storage controller, by sending a completion signal to said processor means.

5. A computer system as set forth in claim 1 wherein said verification means also verifies when both of said storage controllers agree on an ending status of execution of said same command, and said first storage controller further comprises sending means, responsive to said agreement, for signalling said ending status to said processor means.

6. A computer system as set forth in claim 1 wherein said processor means provides a time stamp with each command in said sequence such that respective commands of said identical sequences have a same time stamp; and said verification means verifies that said same command to be executed next by said second storage controller includes a same time stamp as said same command to be executed next by said first storage controller.

7. A computer system as set forth in claim 1 further comprising:
   first and second storage devices respectively coupled to and controlled by said first and second storage controllers; and wherein
   said commands include writes to said storage devices.

8. A computer system as set forth in claim 1 wherein said processor means comprises first and second processors, said first processor generating said sequence of commands and passing said sequence to said second processor, and said second processor replicating said sequence of commands to generate said identical sequences of commands.

9. A computer system as set forth in claim 8 wherein said second processor is an input/output processor and said first processor executes a user's application program.

10. A method for executing commands to generate dual copies of data, said method comprising the steps of:

a processor generating identical sequences of commands and sending said identical sequences to first and second storage controllers, each of said storage controllers receiving the respective sequence of commands without said respective sequence of commands first passing through the other storage controller;

said first storage controller communicating with said second storage controller to verify that said second storage controller has received a same command as said first storage controller in said sequence and will execute said same command as said first storage controller next; and each of said storage controllers responding to the verification by executing said same command next.

11. A method system as set forth in claim 10 wherein said first storage controller also communicates with said second storage controller to verify that both of said storage controllers have executed a last command preceding said same command before each storage controller executes said same command.

12. A method as set forth in claim 10 wherein said first storage controller also verifies when both of said storage controllers have completed execution of said same command; and said first storage controller, responds to the verification of execution completion, by sending a completion signal to the processor.

13. A method as set forth in claim 12 wherein said first storage controller also determines when an error condition has occurred during execution of said same command in said first storage controller, and responds to successful completion of execution of said same command in said second storage controller and an error condition during execution of said same command in said first storage controller, by sending a completion signal to said processor.

14. A method as set forth in claim 10 wherein said first storage controller also verifies when both of said storage controllers agree on an ending status of execution of said same command, and said first storage controller responds to said agreement, by signalling said ending status to said processor.

15. A method as set forth in claim 10 wherein said processor provides a time stamp with each command in said sequence such that respective commands of said identical sequences have a same time stamp; and said first storage controller verifies that said same command to be executed next by said second storage controller includes a same time stamp as said same command to be executed next by said first storage controller.

16. A method as set forth in claim 10 further comprising the step of said first and second storage controllers controlling first and second storage devices, respectively; and wherein said commands include writes to said storage devices.

17. A method as set forth in claim 10 wherein said processor is an I/O processor and further comprising the step of linking a host processor to said I/O processor, and further comprising the steps of said host processor generating said sequence of commands and passing said sequence to said I/O processor, and said I/O processor replicating said sequence of commands to generate said identical sequences of commands.

18. A method as set forth in claim 17 wherein said host processor executes a user's application program.

* * * * *